(12) United States Patent
Sofia et al.

(10) Patent No.: US 11,522,683 B2
(45) Date of Patent: Dec. 6, 2022

(54) MULTI-PHASE PROTECTION FOR DATA-CENTRIC OBJECTS

(71) Applicant: INTERNATIONAL BUSINESS MACHINES CORPORATION, Armonk, NY (US)

(72) Inventors: Anthony Thomas Sofia, Hopewell Junction, NY (US); James M. Caffrey, Woodstock, NY (US); Thomas Ginader, Wappingers Falls, NY (US); Jason G. Katonica, Glenmont, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 122 days.

(21) Appl. No.: 17/111,560

(22) Filed: Dec. 4, 2020

(65) Prior Publication Data
US 2022/0182233 A1    Jun. 9, 2022

(51) Int. Cl.
*H04L 9/08*    (2006.01)
*H04L 9/14*    (2006.01)
*H04L 9/32*    (2006.01)

(52) U.S. Cl.
CPC .......... *H04L 9/0822* (2013.01); *H04L 9/0897* (2013.01); *H04L 9/14* (2013.01); *H04L 9/3234* (2013.01)

(58) Field of Classification Search
None
See application file for complete search history.

(56) References Cited

U.S. PATENT DOCUMENTS

| 9,330,275 B1 * | 5/2016 | Endresen ............ G06F 21/6218 |
| 9,819,987 B2 * | 11/2017 | Reddy ................ H04N 21/6334 |
| 10,615,970 B1 | 4/2020 | Griffin et al. |

(Continued)

OTHER PUBLICATIONS

Hortonworks "Configuring Apache HDFS Encryption" published Jul. 15, 2018; retrieved: https://docs.cloudera.com/HDPDocuments/HDP3/HDP-3.1.0/configuring-hdfs-encryption/sec_configuring_hdfs_encryption.pdf ; 41 pgs.

(Continued)

*Primary Examiner* — Benjamin E Lanier
(74) *Attorney, Agent, or Firm* — Cantor Colburn LLP; Edward Wixted

(57) ABSTRACT

Aspects of the invention include protecting data objects in a computing environment based on physical location. Aspects include receiving, by a computing system, a request to access an encrypted data from an authenticated user, wherein the encrypted data includes information about a data encryption key used to encrypt the encrypted data. Aspects also include providing, by the computing system, the encrypted data to the computer system where the user was authenticated, the computer system including a set of decryption keys protected by a master key stored within a hardware security module associated with the location of the hardware security module. Aspects further include decrypting, by the hardware security module, the encrypted data based on a determination that the data encryption key corresponds to one of the set of decryption keys, wherein the set of decryption keys are determined based on the location of the hardware security module.

18 Claims, 5 Drawing Sheets

(56) References Cited

U.S. PATENT DOCUMENTS

| | | | |
|---|---|---|---|
| 10,826,693 B2* | 11/2020 | Iyer | H04L 9/0861 |
| 2004/0039924 A1 | 2/2004 | Baldwin et al. | |
| 2012/0185701 A1* | 7/2012 | Balinsky | G06F 21/6209 |
| | | | 713/193 |
| 2018/0124066 A1* | 5/2018 | Minkovich | H04L 9/3297 |
| 2019/0013936 A1 | 1/2019 | Murray et al. | |
| 2019/0394024 A1 | 12/2019 | Vepa et al. | |

OTHER PUBLICATIONS

Mell, Peter et al. "The NIST Definition of Cloud Computing", NIST National Institute of Standards and Technology, U.S. Department of Commerce, Special Publication 800-145, dated Sep. 2011; 7 pgs.
International Search Report; International Application No. GB2116712.7 ; International Filing Date: Nov. 19, 2021 ; dated Jul. 7, 2022; 20 pages.

* cited by examiner

MULTI-PHASE PROTECTION FOR DATA-CENTRIC OBJECTS

BACKGROUND

The present invention generally relates to data protection, and more specifically, to protecting data objects in a computing environment based on physical location.

Often an enterprise uses data protection systems that include perimeters of trust to protect their data. In such systems, data protected in a perimeter of trust cannot be moved to another destination.

SUMMARY

Embodiments of the present invention are directed to methods for protecting data objects in a computing environment based on physical location. A non-limiting example computer-implemented method includes receiving, by a computing system of the computing environment, a request to access an encrypted data from an authenticated user, wherein the encrypted data includes information about a data encryption key used to encrypt the encrypted data. The method also includes providing, by the computing system, the encrypted data to the computer system where the user was authenticated, the computer system including a set of decryption keys protected by a master key stored within a hardware security module associated with the location of the hardware security module. The method further includes decrypting, by the hardware security module, the encrypted data based on a determination that the data encryption key corresponds to one of the set of decryption keys, wherein the set of decryption keys are determined based on the location of the hardware security module.

Embodiments of the present invention are directed to systems for protecting data objects in a computing environment based on physical location. A non-limiting example system includes a first computing system, a second computing system, and a data storage device in communication with one another. The first computing system is disposed at a first location and includes a first hardware security module containing a first master key protecting a first set of decryption keys. The second computing system is disposed at a second location and includes a second hardware security module containing a second master key protecting a second set of decryption keys. The first set of decryption keys being determined based on the first location and the second set of decryption keys being determined based on the second location.

Embodiments of the present invention are directed to computer program product for protecting data objects in a computing environment based on physical location. A non-limiting example computer program product includes a computer readable storage medium having program instructions embodied therewith, the program instructions executable by a processor to cause the processor to perform operations including receiving, by a computing system of the computing environment, a request to access an encrypted data from an authenticated user, wherein the encrypted data includes information about a data encryption key used to encrypt the encrypted data. The operations also include providing, by the computing system, the encrypted data to the computer system where the user was authenticated, the computer system including a set of decryption keys protected by a master key stored within a hardware security module associated with the location of the hardware security module. The aperations further include decrypting, by the hardware security module, the encrypted data based on a determination that the data encryption key corresponds to one of the set of decryption keys, wherein the set of decryption keys are determined based on the location of the hardware security module.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Embodiments include methods, systems, and computer program products for protecting data objects in a computing environment based on physical location. In exemplary embodiments, a computing system in each location is associated with a hardware security module (HSM) that is used to protect a master key which acts as a wrapping key for protecting keys stored in the computing system. As a result, the keys stored in the computing system are then bound to the HSM. In exemplary embodiments, access to encrypted data is restricted to users that have access to the HSM and access to the computing system, which is controlled through traditional enterprise technologies, such as lightweight directory access protocol (LDAP).

In one embodiment, a master secret is used to unlock an entire key hierarchy. In some embodiments, the master secret is stored in a file in the computing system, which is then protected by n randomly generated values that are used to derive an encryption key used to encrypt the master secret. In one embodiment, the creation of the master key is performed within a trusted computing environment with no direct physical access to the computing system. The n randomly generated values can then themselves be secured by encryption with an HSM. This then binds those randomly generated values to a specific HSM. These randomly generated values are used to control access to the rest of the encryption/decryption keys in the computing system. When data is encrypted, information about the key that was used during the encryption is embedded within the data.

Figure 1:
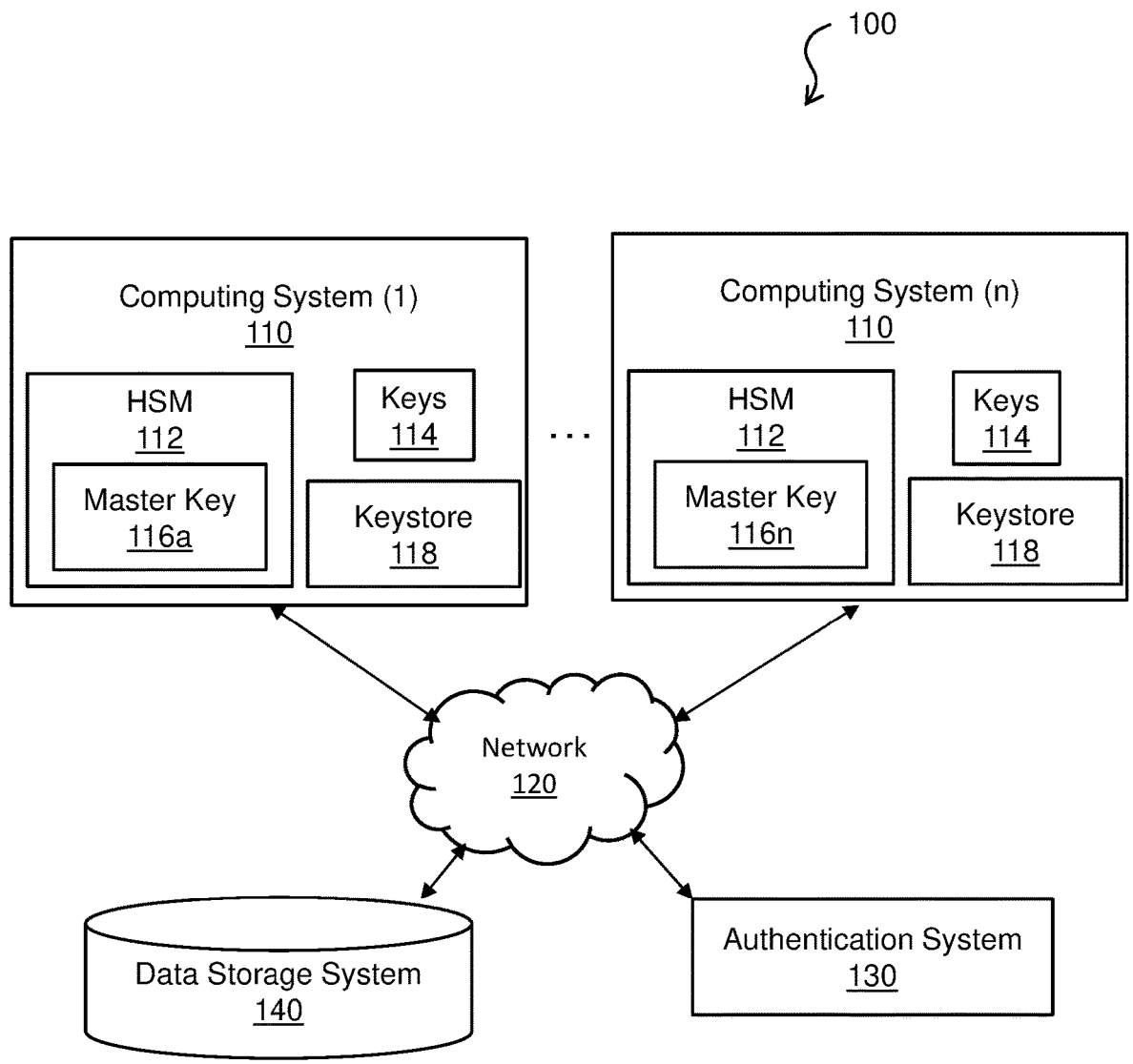
FIG. 1 depicts a block diagram of a computing environment including a system for protection for data objects based on physical location in accordance with one or more embodiments of the present invention.

Turning now to FIG. 1 a block diagram of a computing environment 100 including a system for protection for data objects based on physical location in accordance with one or more embodiments of the present invention is shown. In exemplary embodiments, the computing environment 100 includes a plurality of computing systems 110, which each include a hardware security module (HSM) 112. In exemplary embodiments, one or more of the computing systems 110 may be embodied in a computing system, such as the one shown in FIG. 3. In other embodiments, one or more of the computing systems 110 may be embodied in a mainframe computing system, such as a Z/ARCHITECTURE MAINFRAME computer sold by IBM. In another embodiment, one or more of the computing systems 110 may be embodied in a cloud computing system, such as the ones shown in FIGS. 4 and 5. The HSM 112 is a physical computing device that is configured to safeguard and manage digital keys and to perform encryption, decryption, and other cryptographic functions. In one embodiment, the HSM 112 is a CRYPTOEXPRESS card sold by IBM.

The computing environment 100 also includes a network 120 that is configured to facilitate communication between the computing systems 110, an authentication system 130, and a data storage system 140. The network 120 may be one or more of, or a combination of, public (e.g., Internet), private (e.g., local area network, wide area network, virtual private network), and may include wireless and wireline transmission systems (e.g., satellite, cellular network, terrestrial networks, etc.). In exemplary embodiments, the authentication system 130 is a centralized identity management system that is configured to authenticate users of the computing systems through the use of traditional enterprise technologies, such as lightweight directory access protocol (LDAP) or the like. The authentication system 130 may be embodied in a computing system, such as the one shown in FIG. 3 or in a cloud computing system, such as the ones shown in FIGS. 4 and 5.

The computing environment 100 further includes a data storage system 140 that is configured to store data objects that are accessible by any computing system 110 in the computing environment. In exemplary embodiments, one or more of the data objects are stored in an encrypted format. The data storage system 140 may be embodied in a computing system, such as the one shown in FIG. 3 or in a cloud computing system, such as the ones shown in FIGS. 4 and 5.

In exemplary embodiments, each HSM 112 contains a unique master key 116a, 116n that acts as a wrapping key for protecting keys 114. The keys 114 are used to unlock keystore 118. The use of the HSM 112 and unique master key 116a, 116n binds the keystore 118 and its contents to the HSM 112 thereby limiting access to the encrypted data object to users that have access to that HSM 112 and access to the associated computing system 110. In exemplary embodiments, the keystore 118 includes a hierarchy of keys, which are each used to decrypt data objects that were encrypted by the data storage system 140. In exemplary embodiments, the keys 114 on each computing system 110 are configured to unlock different portions or subsets of the hierarchy of keys in the keystore 118.

Figure 2:
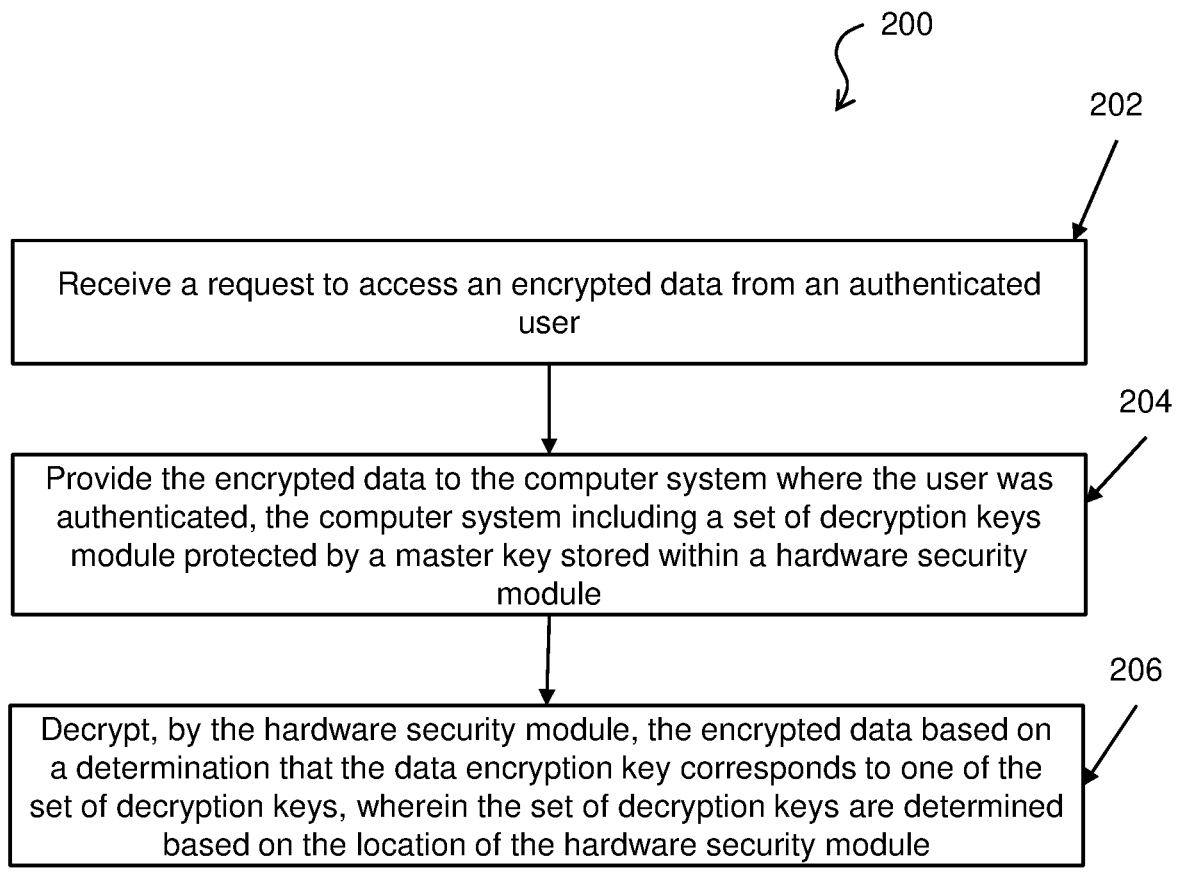
FIG. 2 depicts a flow diagram of a method for protecting data objects in a computing environment based on physical location in accordance with one or more embodiments of the present invention.

Referring now to FIG. 2 a flow diagram of a method 200 for protecting data objects in a computing environment based on physical location in accordance with one or more embodiments of the present invention is shown. As shown at block 202, the method 200 includes receiving a request to access encrypted data from an authenticated user. In exemplary embodiments, the encrypted data includes information about a data encryption key used to encrypt the encrypted data. Next, as shown at block 204, the method 200 includes providing the encrypted data to the computer system where the user was authenticated. In exemplary embodiments, the authenticated user is authenticated by an authentication system of the computing environment that is configured to verify an identity of a user of the computer system.

In exemplary embodiments, the computer system includes a set of decryption keys protected by a master key stored within a hardware security module, the master key being associated with a location of the hardware security module. The set of decryption keys are configured to decrypt a subset of encrypted data objects in an encrypted data storage device of the computing environment. In exemplary embodiments, the master key is unique to the hardware security module. In exemplary embodiments, the master key is loaded into the hardware security module by a security administrator of the computing environment.

The method 200 also includes decrypting, by the hardware security module, the encrypted data based on a determination that the data encryption key corresponds to one of the set of decryption keys, wherein the set of decryption keys are determined based on the location of the hardware security module. In exemplary embodiments, the method 200 includes denying access to the encrypted data based on a determination that the data encryption key does not correspond to one of the set of decryption keys. In exemplary embodiments, an identification of a hardware security module associated with the location includes determining one or more attributes of the authenticated user. The one or more attributes of the authenticated user include one or more of a physical location of the authenticated user, an access group of the authenticated user, and an organizational role of the authenticated user.

In exemplary embodiments, when a user wants to access protected data inside the computing environment, multiple authentication checks are performed. First, the user must authenticate with the authentication system. Next, the user will present the protected data to a computing system in the computing environment, the protected data including embedded information about the data encryption key (DEK) that was used to protect the data. Then the DEK will be found in the computing system and will be used to decrypt the protected data. The decryption of the protected data will only work in environments where the HSM is available for the key material to be decrypted for use. As a result, physical perimeters can be created that allow users to log into different computing system across a computing environment, but the users will only be able to access specific types of protected data in each computing system based on the HSM associated with the computing system.

One or more embodiments of the present invention provide technological improvements over current methods of data protection. In exemplary embodiments, the computing environment provides for a separation of duties between system administrators and security administrators that allow for a higher level of protection and control of sensitive data in a geographically disperse computing environment. In exemplary embodiments, a security administrator can remove access to protected data by a computing system by removing HSM access for that computing system without any interaction with a system administrator of the computing system. In addition, while a system administrator can replicate a computing system in the computing environment at one location to a second location, the security administrator would need to provision a HSM at the second location in order for users at the second location to be able to access protected data.

Figure 3:
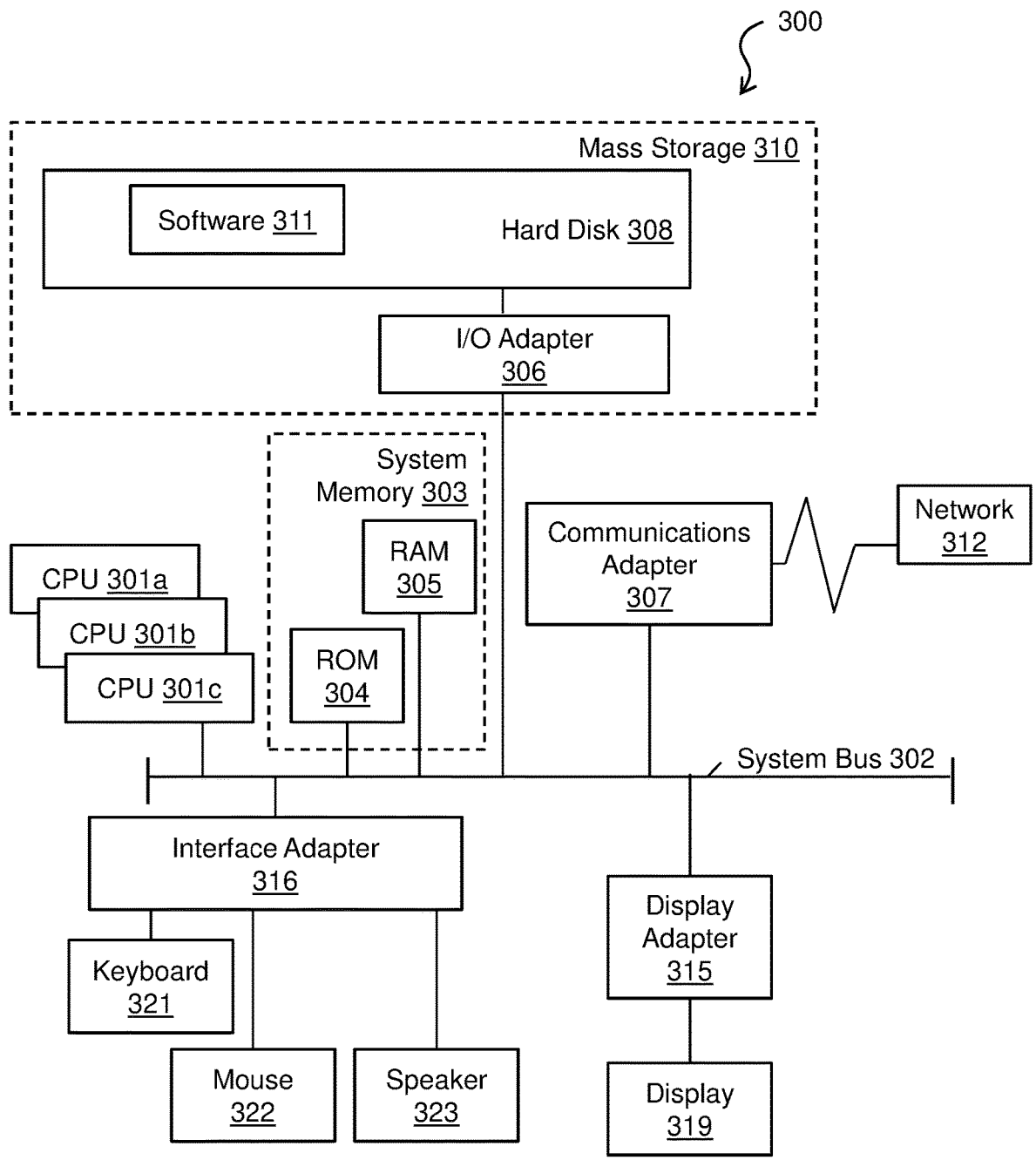
FIG. 3 depicts a computing system according to one or more embodiments of the present invention.

Turning now to FIG. 3, a computer system 300 is generally shown in accordance with an embodiment. The computer system 300 can be an electronic, computer framework comprising and/or employing any number and combination of computing devices and networks utilizing various communication technologies, as described herein. The computer system 300 can be easily scalable, extensible, and modular, with the ability to change to different services or reconfigure some features independently of others. The computer system 300 may be, for example, a server, desktop computer, laptop computer, tablet computer, or smartphone. In some examples, computer system 300 may be a cloud computing node. Computer system 300 may be described in the general context of computer system executable instructions, such as program modules, being executed by a computer system. Generally, program modules may include routines, programs, objects, components, logic, data structures, and so on that perform particular tasks or implement particular abstract data types. Computer system 300 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, the computer system 300 has one or more central processing units (CPU(s)) 301a, 301b, 301c, etc. (collectively or generically referred to as processor(s) 301). The processors 301 can be a single-core processor, multi-core processor, computing cluster, or any number of other configurations. The processors 301, also referred to as processing circuits, are coupled via a system bus 302 to a system memory 303 and various other components. The system memory 303 can include a read only memory (ROM) 304 and a random access memory (RAM) 305. The ROM 304 is coupled to the system bus 302 and may include a basic input/output system (BIOS), which controls certain basic functions of the computer system 300. The RAM is read-write memory coupled to the system bus 302 for use by the processors 301. The system memory 303 provides temporary memory space for operations of said instructions during operation. The system memory 303 can include random access memory (RAM), read only memory, flash memory, or any other suitable memory systems.

The computer system 300 comprises an input/output (I/O) adapter 306 and a communications adapter 307 coupled to the system bus 302. The I/O adapter 306 may be a small computer system interface (SCSI) adapter that communicates with a hard disk 308 and/or any other similar component. The I/O adapter 306 and the hard disk 308 are collectively referred to herein as a mass storage 310.

Software 311 for execution on the computer system 300 may be stored in the mass storage 310. The mass storage 310 is an example of a tangible storage medium readable by the processors 301, where the software 311 is stored as instructions for execution by the processors 301 to cause the computer system 300 to operate, such as is described herein below with respect to the various Figures. Examples of computer program product and the execution of such instruction is discussed herein in more detail. The communications adapter 307 interconnects the system bus 302 with a network 312, which may be an outside network, enabling the computer system 300 to communicate with other such systems. In one embodiment, a portion of the system memory 303 and the mass storage 310 collectively store an operating system, which may be any appropriate operating system, such as the z/OS or AIX operating system from IBM Corporation, to coordinate the functions of the various components shown in FIG. 3.

Additional input/output devices are shown as connected to the system bus 302 via a display adapter 315 and an interface adapter 316 and. In one embodiment, the adapters 306, 307, 315, and 316 may be connected to one or more I/O buses that are connected to the system bus 302 via an intermediate bus bridge (not shown). A display 319 (e.g., a screen or a display monitor) is connected to the system bus 302 by a display adapter 315, which may include a graphics controller to improve the performance of graphics intensive applications and a video controller. A keyboard 321, a mouse 322, a speaker 323, etc. can be interconnected to the system bus 302 via the interface adapter 316, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 3, the computer system 300 includes processing capability in the form of the processors 301, and, storage capability including the system memory 303 and the mass storage 310, input means such as the keyboard 321 and the mouse 322, and output capability including the speaker 323 and the display 319.

In some embodiments, the communications adapter 307 can transmit data using any suitable interface or protocol, such as the internet small computer system interface, among others. The network 312 may be a cellular network, a radio network, a wide area network (WAN), a local area network (LAN), or the Internet, among others. An external computing device may connect to the computer system 300 through the network 312. In some examples, an external computing device may be an external webserver or a cloud computing node.

It is to be understood that the block diagram of FIG. 3 is not intended to indicate that the computer system 300 is to include all of the components shown in FIG. 3. Rather, the computer system 300 can include any appropriate fewer or additional components not illustrated in FIG. 3 (e.g., additional memory components, embedded controllers, modules, additional network interfaces, etc.). Further, the embodiments described herein with respect to computer system 300 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
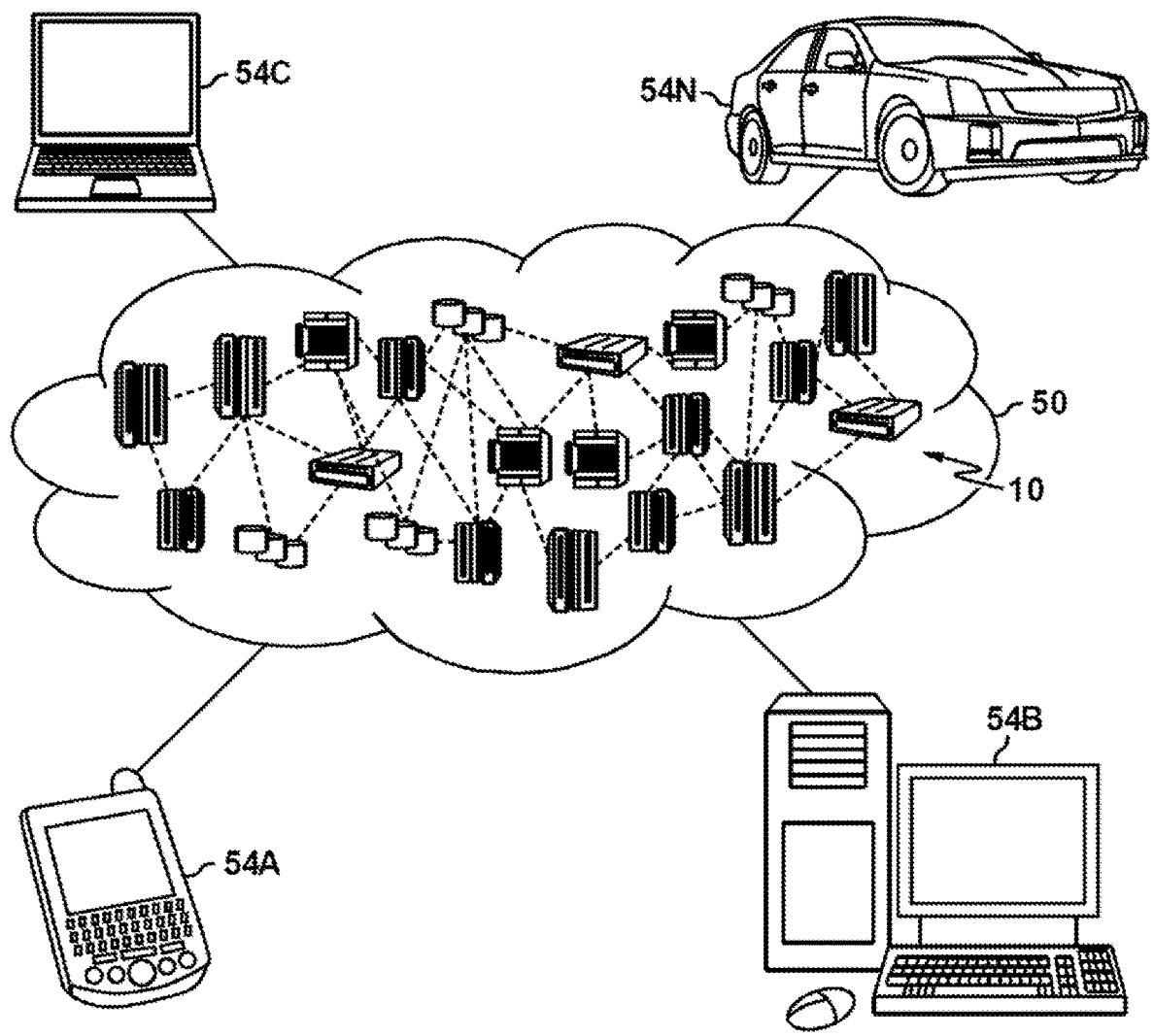
FIG. 4 depicts a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
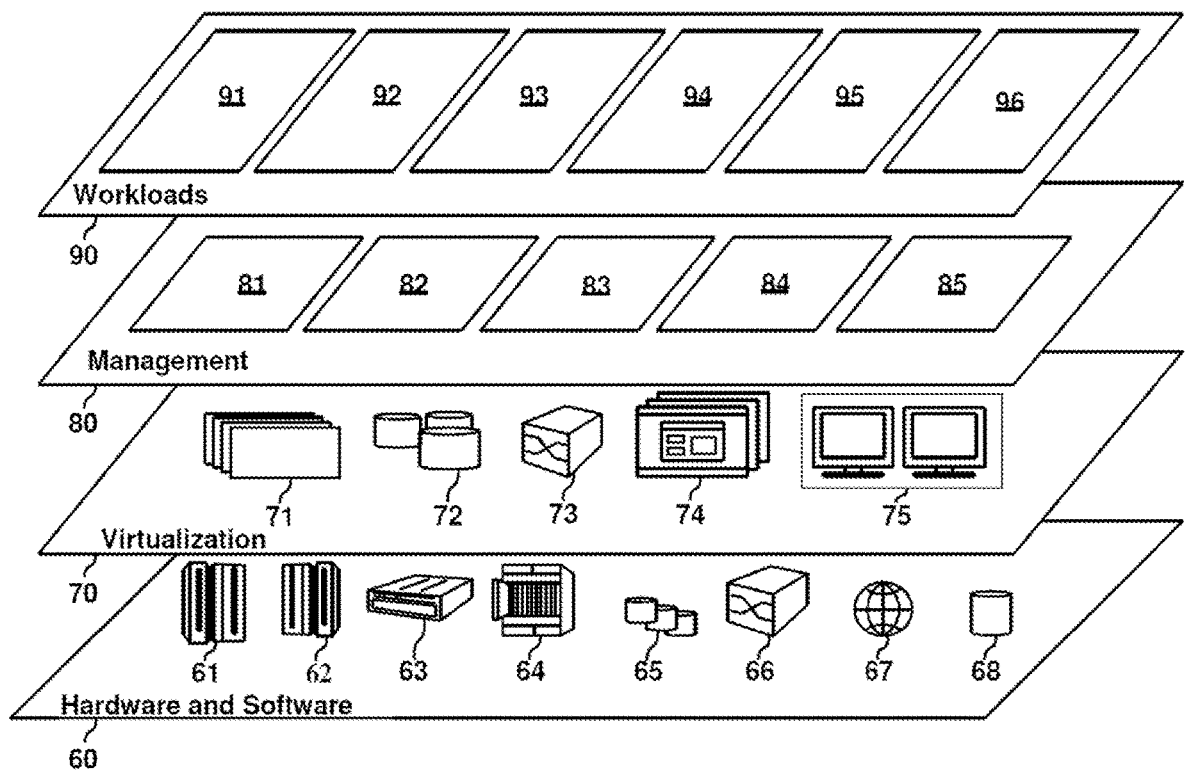
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data protection 96.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system for protection for data objects based on physical location, the system comprising:
a computing environment including a first computing system, a second computing system, an authentication system, and a data storage device in communication with one another, wherein:
the first computing system is disposed at a first location and includes a first hardware security module containing a first master key that acts as a wrapping key for protecting a first set of decryption keys;
the second computing system is disposed at a second location and includes a second hardware security module containing a second master key that acts as a wrapping key for protecting a second set of decryption keys;
the first set of decryption keys being determined based on the first location; and
the second set of decryption keys being determined based on the second location,
wherein the authentication system controls user access to the first computing system and the second computing system,
wherein the first computing system is configured to receive encrypted data from an authenticated user at the first location, wherein the encrypted data includes embedded information about a data encryption key used to encrypt the encrypted data; and
wherein the first set of decryption keys are configured to unlock a keystore of the first computing system, wherein the keystore that includes a hierarchy of keys, which are each used to decrypt data objects that were encrypted by the data storage system.

2. The system of claim 1, wherein the first set of decryption keys are configured to decrypt a first subset of encrypted data objects in the data storage device.

3. The system of claim 2, wherein the second set of decryption keys are configured to decrypt a second subset of encrypted data objects in the data storage device and wherein the first subset is different from the second subset.

4. The system of claim 1, wherein the first computing system is further configured to decrypt the encrypted data based on a determination that the data encryption key corresponds to one of the first set of decryption keys.

5. A method for protecting data objects in a computing environment based on physical location, the method comprising:
receiving, by a computing system of the computing environment, a request to access an encrypted data from an authenticated user, wherein the encrypted data includes information about a data encryption key used to encrypt the encrypted data;
providing, by the computing system, the encrypted data to the computer system where the user was authenticated, the computer system including a set of decryption keys protected by a master key stored within a hardware security module, wherein the set of decryption keys are determined based on associated with the location of the hardware security module;
decrypting, by the hardware security module, the encrypted data based on a determination that the data encryption key corresponds to one of the set of decryption keys, wherein the set of decryption keys are determined based on the location of the hardware security module,
wherein the computing system is configured to receive encrypted data from the authenticated user, wherein the encrypted data includes embedded information about a data encryption key used to encrypt the encrypted data; and
wherein the set of decryption keys are configured to unlock a keystore of the computing system, wherein the keystore that includes a hierarchy of keys, which are each used to decrypt data objects that were encrypted.

6. The method of claim 5, wherein the authenticated user is authenticated by an authentication system of the computing environment that is configured to verify an identity of a user of the computer system.

7. The method of claim 5, wherein the master key is unique to the hardware security module.

8. The method of claim 5, wherein the set of decryption keys are configured to decrypt a subset of encrypted data objects in a data storage device of the computing environment.

9. The method of claim 5, further comprising denying access to the encrypted data based on a determination that the data encryption key does not correspond to one of the set of decryption keys.

10. The method of claim 5, wherein an identification of the hardware security module associated with the location includes determining one or more attributes of the authenticated user.

11. The method of claim 5, wherein the one or more attributes of the authenticated user include one or more of a physical location of the authenticated user, an access group of the authenticated user, and an organizational role of the authenticated user.

12. A computer program product comprising a computer readable storage medium having program instructions embodied therewith, the program instructions executable by a processor to cause the processor to perform operations comprising:
receiving, by a computing system of the computing environment, a request to access an encrypted data from an authenticated user, wherein the encrypted data includes information about a data encryption key used to encrypt the encrypted data;
providing, by the computing system, the encrypted data to the computer system where the user was authenticated, the computer system including a set of decryption keys protected by a master key stored within a hardware security module, wherein the set of decryption keys are determined based on associated with the location of the hardware security module;
decrypting, by the hardware security module, the encrypted data based on a determination that the data encryption key corresponds to one of the set of decryption keys, wherein the set of decryption keys are determined based on the location of the hardware security module,
wherein the computing system is configured to receive encrypted data from the authenticated user, wherein the encrypted data includes embedded information about a data encryption key used to encrypt the encrypted data; and wherein the set of decryption keys are configured to unlock a keystore of the computing system, wherein the keystore that includes a hierarchy of keys, which are each used to decrypt data objects that were encrypted.

13. The computer program product of claim 12, wherein the authenticated user is authenticated by an authentication system of the computing environment configured to verify an identity of a user of the computer system.

14. The computer program product of claim 12, wherein the master key is unique to the hardware security module.

15. The computer program product of claim 12, wherein the set of decryption keys are configured to decrypt a subset of encrypted data objects in a data storage device of the computing environment.

16. The computer program product of claim 12, wherein the operations further comprise denying access to the encrypted data based on a determination that the data encryption key does not correspond to one of the set of decryption keys.

17. The computer program product of claim 12, wherein an identification of the hardware security module associated with the location includes determining one or more attributes of the authenticated user.

18. The computer program product of claim 12, wherein the one or more attributes of the authenticated user include one or more of a physical location of the authenticated user, an access group of the authenticated user, and an organizational role of the authenticated user.

* * * * *